United States Patent Office 3,567,702
Patented Mar. 2, 1971

3,567,702
PROCESS FOR PREPARATION OF HIGH MOLECULAR WEIGHT CIS-1,4 POLYISOPRENE AND POLYMERIZATION CATALYST THEREFOR
Kan Mori, Hiroharu Ikeda, and Shigetoshi Hirayanagi, Yokkaichi-shi, Isamu Shimizu, Kameyama-shi, and Akira Kogure, Yokkaichi-shi, Japan, assignors to Japan Synthetic Rubber Co., Ltd., Tokyo, Japan
No Drawing. Filed Oct. 3, 1968, Ser. No. 764,922
Claims priority, application Japan, Oct. 7, 1967, 42/64,416
Int. Cl. C08d 3/10
U.S. Cl. 260—94.3    3 Claims

ABSTRACT OF THE DISCLOSURE

An improved process for preparation of a high-molecular-weight polyisoprene consisting principally of cis-1,4 units commercially advantageously at high yield by using a novel three-component catalyst composed of (A) a titanium halide, (B) an organoaluminium compound expressed by the formula $AlR_3$, wherein R is a member selected from the group consisting of alkyl groups, aryl groups and cycloalkyl groups, and (C) an aromatic compound selected from the group consisting of phenol, substituted phenols, hydroxy-substituted diphenyls, naphthols, said three-component catalyst being obtained by adding component (A) to a mixture of component (B) and component (C), and substituted naphthols.

This invention relates to an improved process for preparation of a high-molecular-weight polyisoprene consisting principally of cis-1,4 units commercially advantageously at high yield by using a novel three-component catalyst, and to the catalyst therefor. More particularly, it relates to a process for preparing polyisoprene consisting principally of cis-1,4 units by polymerizing isoprene in an inert atmosphere in the presence of a catalyst, characterized in that the polymerization reaction is carried out in the presence of a three-component catalyst composed of (A) a titanium halide, preferably a titanium tetrahalide, (B) an organoaluminium compound expressed by the formula $AlR_3$, wherein R is a member selected from the group consisting of alkyl groups, preferably $C_1$–$C_8$ alkyl groups, aryl groups, preferably phenyl group, and cycloalkyl groups, preferably cyclohexyl group, and (C) an aromatic compound selected from the group consisting of phenol, substituted phenols, preferably hydroxy and/or alkyl substituted phenols, hydroxy-substituted diphenyls, naphthols, and substituted naphthols, preferably hydroxy and/or alkyl substituted naphthols; and to the said catalyst.

A method of preparing polyisoprene consisting principally of cis-1,4 units with the use of a Ziegler-type catalyst, for instance, the method of producing substantially cis-1,4 solid polyisoprene which comprises the steps of adding to monomeric isoprene a liquid hydrocarbon solvent containing a catalyst consisting essentially of the compositions produced by adding to said solvent (a) a titanium tetrahalide and (b) a trialkyl aluminum wherein each alkyl group contains from 2 to 8 carbon atoms, in proportions of (a) and (b) such as to provide in said catalyst a molar ratio of titanium to aluminum of 0.5 to 1 to 1.5 to 1 (see U.S. Pat. 3,114,743) is known. Such a two-component catalyst, however, is generally very sensitive to water and atmospheric air, and considerably changes in its ability even by slight changes of the reaction atmosphere and conditions which may occur under operational conditions. It therefore involves difficulty in handling the catalyst and in controlling the polymerization procedure, and also a bad reproducibility of the polymerization reaction. Thus, it is considerably difficult to obtain a product of uniform quality. With a titanium tetrachloride/triethyl aluminium catalyst, which is a typical example of a two-component catalyst of this type, it is difficult to obtain a high-molecular-weight polymer at a high yield.

The production of oil extended polyisoprene is desired from an economical standpoint, and in this case, polyisoprene having a Mooney viscosity ($ML_{1+4}$) of 70 to 120 is particularly desired. But polyisoprene obtained by using the above-mentioned two-component catalyst generally does not have a Mooney viscosity high enough to satisfy these needs.

An object of the present invention is to provide an improved process for preparing high-molecular-weight polyisoprene consisting principally of cis-1,4 units, which satisfy these needs, at high yield, and to provide a ctalyst used in accordance with this process.

According to the invention, not only a polymer of high molecular weight, usually a polymer having a cis-1,4 content of about 97–98%, an $(\eta)$ of at least 4, and an $ML_{1+4}$ of at least 50 is obtained easily at high yield, but also the reproducibility of the polymerization reaction and that of the quality of the obtained polymer are remarkably improved, rendering an easy handling of the catalyst. The process is therefore commercially advantageous.

The catalyst of the invention is obtained by mixing the abovementioned three components (A), (B) and (C). As the titanium halide (A), preferable is a titanium tetrahalide, such as titanium tetrachloride, titanium tetrabromide and titanium tetraiodide. The use of titanium tetrachloride is especially recommended. Preferable organoaluminium compounds include trialkyl aluminium compounds having $C_1$–$C_8$ alkyl groups, such as trimethyl aluminium, triethyl aluminium, tripropyl aluminium, triisobutyl aluminium, trihexyl aluminium, and trioctyl aluminium, triaryl aluminium compounds such as triphenyl aluminium, and tricycloalkyl aluminium compounds such as tricyclohexyl aluminium. As the aromatic compound (C), there may be used phenols or naphthols which may have a substituent, preferably hydroxyl or alkyl group, and hydroxy-substituted diphenyl. Examples of the phenols are phenol, ortho-cresol, meta-cresol, para-cresol, para-ethylphenol, para-propyl phenol, paratert. butyl phenol, 2,4-dimethyl phenol, 3,5-dimethyl phenol, 3,4-dimethyl phenol, 3,4,5-trimethyl phenol, catechol, and para-tert. butyl catechol, and examples of the naphthols are α-naphthol, β-naphthol, 1-methyl-6-naphthol, 1-methyl-7-naphthol and 4-methyl-2-naphthol. The hydroxyl-substituted diphenyl includes 4-hydroxydiphenyl.

These three components are usually mixed with one another in an inert organic solvent in an inert atmosphere. Although no restriction is imposed on the order of addition of the three components, it is particularly desirable to mix component (A) with a mixture of components (B) and (C). As the inert organic solvent, aromatic hydrocarbons such as benzene and toluene and aliphatic hydrocarbons such as pentane, hexane and heptane are preferably used. On the other hand, nitrogen, argon, or a mixture of these can be preferably used to form the inert atmosphere.

In the preparation of the catalyst, the molar ratio of component (B) to component (C) is important. It is preferred that 0.3–1.5 moles, particularly preferably 0.5–1.0 mole, of component (C) be used per mole of component (B). The molar ratio of component (A) to component (B) is usually 0.1–2:1, preferably 0.2–1:1, although varying depending on the amount of component (C).

Alternatively, the catalyst of the invention can be prepared by mixing the three components in the presence of a part or whole of isoprene to be polymerized.

The polymerization according to the invention can be conducted by mixing the catalyst components in the presence of the monomer in a suitable organic solvent or in the absence of a solvent, or by adding the monomer after mixing the catalyst components. As such a solvent, the inert organic solvent mentioned before with regard to the preparation of the catalyst can be used. The polymerization reaction is carried out in an inert atmosphere. The inert gas mentioned above with respect to the preparation of the catalyst can be used as the inert atmosphere.

There is no restriction about the polymerization temperature, and the polymerization can be conducted usually at −30° to 80° C. No restriction is imposed either on the reaction pressure, and the pressure may be one sufficient to maintain the reaction mixture in liquid phase.

When the polymerization reaction advances to the desired stage, the reaction is stopped by a usual method, for instance, by addition of deoxygenated methanol. The resulting polymer is separated, washed and dried to obtain the intended polyisoprene. The reaction can be conducted either batchwise or continuously. It should be understood that the process of the invention can be practiced in a variety of modified forms known in the art of producing polyisoprene.

Incidentally, prior to completing this invention, we developed a three-component catalyst wherein $BF_3$·phenol complex is used as the component corresponding to component (C), and applied it for a patent (see copending application No. 691,161, now Patent No. 3,479,331). As compared with this catalyst, the catalyst of the present invention has advantages: the catalyst of the present invention is low in cost because the Al/Ti ratio can be made small; enables the polymerization to proceed smoothly at high temperatures, thus obviating the necessity of providing a particular cooling means; and does not pose the problem of corrosion because $BF_3$ is not necessary.

The following examples are presented to illustrate the invention specifically, and are not intended to be limitative.

EXAMPLE 1

A 1-liter separable flask was thoroughly purged with nitrogen, and charged with 60 ml. of toluene and 7.2 ml. of a 1 mol/liter (7.2 millimols as $AlEt_3$) toluene solution of triethyl aluminium ($AlEt_3$). While agitating the contents of the flask at 10° C., 6.48 ml. of a 1 mol/liter (6.48 millimols as phenol) toluene solution of phenol was added, and the mixture was reacted for 10 minutes at this temperature. Eight milliliters of a 0.5 mol/liter (4 millimols as $TiCl_4$) toluene solution of titanium tetrachloride ($TiCl_4$) was added, and the mixture was agitated for 30 minutes at 20° C. On addition of 240 ml. of toluene and 54.4 g. of isoprene, the reaction was conducted for 2 hours at 10° C. Thirty milliliters of deoxygenated methanol was added to the reacted mixture to deactivate the catalyst, and then a polymer was precipitated in a great quantity of methanol containing 2,6-di-tert.-butyl-4-methyl-phenol. The obtained polymer weighed 38.1 g. (70% yield) and had an [$\eta$] of 4.9 and an $ML_{1+4}$ of 71.

EXAMPLE 2

In this example, para-cresol was used in place of the phenol used in Example 1.

The reaction was conducted in quite the same manner as in Example 1 in a 1-liter separable flask using 7.2 millimols of $AlEt_3$, 6.48 millimols of para-cresol, 4 millimols of $TiCl_4$ and 54.4 g. of isoprene. There was obtained 27.8 g. (51% yield) of a polymer having an [$\eta$] of 5.5 and an $ML_{1+4}$ of 76.

EXAMPLES 3–13

In each of these examples, polymerization was conducted in a 100 ml. sealed tube with the use of a different phenol or naphthol as component (C).

A thoroughly nitrogen-purged 100 ml. pressure glass vessel with branches was charged with 7.1 ml. of toluene and 1 ml. of a 1 mol/liter (1.0 millimol as $AlEt_3$) toluene solution of $AlEt_3$. While the mixed solution was agitated at 10° C., 0.9 ml. of a 1 mol/liter (0.9 millimol as phenol or naphthol) toluene solution of phenol or naphthol was added. The reaction was conducted for 10 minutes at this temperature. On addition of 1 ml. of a 0.5 mol/liter (0.5 millimol as $TiCl_4$) toluene solution of $TiCl_4$, the mixture was agitated for 60 minutes at 20° C. Thirty milliliters of toluene and 6.8 g. of isoprene were added, and the glass vessel was sealed. The reaction was conducted for 4 hours at 10° C. The yield and [$\eta$] of each of the polymers obtained are shown in Table 1.

TABLE 1

| | | Yield | | |
|---|---|---|---|---|
| | Phenol or naphthol | grams | Percent | [$\eta$] |
| Examples: | | | | |
| 3 | Phenol | 5.44 | 80.0 | 4.3 |
| 4 | O-cresol | 5.02 | 73.8 | 4.6 |
| 5 | Micresol | 5.09 | 74.8 | 4.7 |
| 6 | P-cresol | 5.00 | 73.6 | 4.5 |
| 7 | Para-tert.-butylphenol | 5.12 | 75.3 | 4.4 |
| 8 | 4-hydroxydiphenyl | 5.53 | 81.4 | 4.4 |
| 9 | 3,4-dimethylphenol | 4.22 | 62.2 | 4.3 |
| 10 | 2,4-dimethylphenol | 4.76 | 70.0 | 4.5 |
| 11 | α-Naphthol | 4.57 | 67.2 | 4.8 |
| 12 | β-Naphthol | 4.98 | 73.3 | 4.6 |
| 13 | Catechol | 4.35 | 64.0 | 4.3 |

EXAMPLE 14

In this example, the Al/Ti molar ratio was adjusted to 1.4.

Polymerization was conducted in the same manner as in Example 3 using 0.84 millimol of $AlEt_3$, 0.76 millimol of phenol, 0.6 millimol of $TiCl_4$ and 6.8 g. of isoprene. There was obtained 4.86 g. (71.5% yield) of a polymer having an [$\eta$] of 4.2.

EXAMPLE 15

In this example, the Al/phenol molar ratio was adjusted to 1.3.

In the same manner as in Example 3, 1.2 millimols of $AlEt_3$ and 0.9 millimol of phenol were reacted for 10 minutes at 10° C. On addition of $TiCl_4$ in an amount of 0.6 millimol, the mixture was agitated for 5 minutes at 50° C. Thereafter, 6.8 g. of isoprene was added, and the reaction was carried out for 5 hours at 10° C. There was obtained 3.7 g. (54.4% yield) of a polymer having an [$\eta$] of 4.6.

EXAMPLE 16

In this example, the amount of the catalyst was reduced, and the polymerization was conducted with the isoprene/Ti molar ratio being 400.

The reaction was conducted in the same manner as in Example 3 using 0.45 millimol of $AlEt_3$, 0.36 millimol of phenol, 0.25 millimol of $TiCl_4$ and 6.8 g. of isoprene. There was obtained 4.38 g. (64.5% yield) of a polymer having an [$\eta$] of 4.4.

EXAMPLE 17

In this example, heptane was used as a solvent in place of the toluene used in Example 3.

The procedure of Example 3 was repeated except the use of heptane, and there was obtained 5.26 g. (77.4% yield) of a polymer having an [$\eta$] of 5.7.

COMPARATIVE EXAMPLE

In this example, component (C) was omitted, and a titanium tetrachloride/triethyl aluminum catalyst was used.

A thoroughly nitrogen-purged 500 ml. separable flask was charged with 380 ml. of toluene, 6 ml. of a 1.0 mol/liter (6 millimols as $AlEt_3$) toluene solution of $AlEt_3$, 10 ml. of a 0.5 mol/liter (5 millimols as $TiCl_4$) toluene solution of $TiCl_4$, and 68 g. of isoprene. Polymerization was conducted for 2 hours at 10° C. while agitating.

There was obtained 29.2 g. (43% yield) of a polymer having an [$\eta$] of 3.0 and an $ML_{1+4}$ of 25.

We claim:
1. A process for preparation of polyisoprene having at least about 97% cis-1,4 units by polymerizing isoprene in an inert atmosphere in the presence of a catalyst, characterized in that the polymerization reaction is conducted in the presence of a three-component catalyst composed of
   (A) an organoaluminum compound expressed by the formula
   $$AlR_3$$
   wherein R is a member selected from the group consisting of alkyl groups, aryl groups and cycloalkyl groups, and
   (C) an aromatic compound selected from the group consisting of phenol, substituted phenols, hydroxy-substituted diphenyls, naphthols and substituted naphthols, said three-component catalyst being obtained by adding component (A) to a mixture of component (B) and component (C).
2. The process according to claim 1 wherein said titanium halide is a titanium tetrahalide, said organoaluminum compound is a compound of the above formula wherein R is a member selected from $C_1$–$C_8$ alkyl groups, phenyl groups and cyclohexyl groups, and said aromatic compound is a member selected from phenols or naphthols which may have a substituent selected from a hydroxyl group and an alkyl group, and hydroxy diphenyl.
3. The process according to claim 1 wherein the molar ratio of component (A) to component (B) is 0.1–2:1, and the molar ratio of component (B) to component (C) is 1:0.3–1.5.

References Cited

UNITED STATES PATENTS 3,150,122   9/1964   Andersen et al. _____ 260—94.9

FOREIGN PATENTS 1,344,552   11/1962   France _____ 260—94.3

JOSEPH L. SCHOFER, Primary Examiner

R. A. GAITHER, Assistant Examiner

S-293

UNITED STATES PATENT OFFICE
CERTIFICATE OF CORRECTION

Patent No. 3,567,702          Dated March 2, 1971

Inventor(s) MORI ET AL

It is certified that error appears in the above-identified patent and that said Letters Patent are hereby corrected as shown below:

Claim 1, after "composed of" in line 5 insert

-- (A) a titanium halide, --

Claim 1, Line 6, delete "(A)" and substitute therefor

-- (B) --.

Signed and sealed this 1st day of June 1971.

(SEAL)
Attest:

EDWARD M. FLETCHER, JR.          WILLIAM E. SCHUYLER, JR.
Attesting Officer          Commissioner of Patents